Nov. 1, 1960 J. H. CLARK 2,958,832

DIFFERENTIAL-PHASE CORRECTOR

Original Filed Dec. 17, 1956 2 Sheets-Sheet 1

INVENTOR
J. H. CLARK
BY
Ralph T. Holcomb
ATTORNEY

Nov. 1, 1960 J. H. CLARK 2,958,832

DIFFERENTIAL-PHASE CORRECTOR

Original Filed Dec. 17, 1956 2 Sheets-Sheet 2

INVENTOR
J. H. CLARK
BY
Ralph T. Holcomb
ATTORNEY

United States Patent Office 2,958,832

Patented Nov. 1, 1960

2,958,832

DIFFERENTIAL-PHASE CORRECTOR

Jean H. Clark, Covina, Calif., assignor to American Telephone and Telegraph Company, New York, N.Y., a corporation of New York Continuation of application Ser. No. 628,815, Dec. 17, 1956. This application Oct. 20, 1959, Ser. No. 849,702

5 Claims. (Cl. 333—28)

This invention relates to wave transmission networks and more particularly to a differential-phase corrector.

This application is a continuation of my application Serial No. 628,815, filed December 17, 1956, now abandoned.

A color television signal comprises a luminance signal, which controls the intensity or brightness of the picture, and a color carrier signal. The relative phase of the color carrier with respect to a reference synchronizing signal determines the hue of the color. Any change in the phase shift of this color carrier due to a variation in the amplitude of the luminance signal, called differential phase, causes a distortion of the color hue.

The object of the present invention is to correct differential phase of the type just defined.

In accordance with the principle underlying the operation of the differential-phase correctors of the present invention, two component signals are derived from the distorted input signal. These signals are unequal in magnitude and are either in phase or 180 degrees out of phase with each other at low frequencies and have a relative phase shift of 90 or 270 degrees at a selected higher operating frequency $f$. The inequality in magnitude may be produced by amplifying one signal or attenuating the other, or by amplifying one and attenuating the other. The relative phase shift can be obtained in a phase-shifting network. One of these component signals is subjected to a differential treatment and then the two signals are recombined. This differential treatment may be provided by mixing the two signals through one or more controllable, nonlinear impedance devices. These devices are responsive to the substantially instantaneous current or voltage in the circuit. Thus, the relative phase shift of the output signal is affected by the amount of the input signal which is allowed to pass through the nonlinear device, and the output signal becomes a function of the substantially instantaneous voltage or current applied to the corrector. Means are provided for adjusting the shape of current versus voltage characteristics of the nonlinear device, and also for providing different responses for different polarities of the applied voltage or current. A plurality of nonlinear devices may be employed to provide simultaneously available corrections for different polarities of the signal and for different curve shapes. Also, biasing currents or voltages may be used to assist in obtaining the proper curve shapes to correct various distortions.

Six embodiments of differential-phase correctors in accordance with the present invention are disclosed herein, by way of example only. Three are for use with a balanced circuit and the others with unbalanced circuits. Each corrector comprises two transmission paths connected in parallel at their input ends and means associated with one of the paths for changing the amplitude of the signal transmitted therethrough. These means may include an amplifier, an attenuator, or both. One of the paths includes also means for shifting the phase of the signal approximately 90 degrees at the frequency $f$.

One or more nonlinear impedance devices are connected in one of the paths. When two are included in the same path, they may be arranged in parallel and oppositely poled so that each will respond to only one polarity of the input signal. Means are also provided for adjusting the current-voltage characteristics of the nonlinear devices, means for adjusting the relative output voltages of the paths, and means for combining these voltages. When an amplifier is employed, a phase-shifting network may be included, if required, to compensate for the phase shift in the amplifier.

The nature of the invention and its various objects, features, and advantages will appear more fully in the following detailed description of the typical embodiments illustrated in the accompanying drawing, of which:

Figure 1:
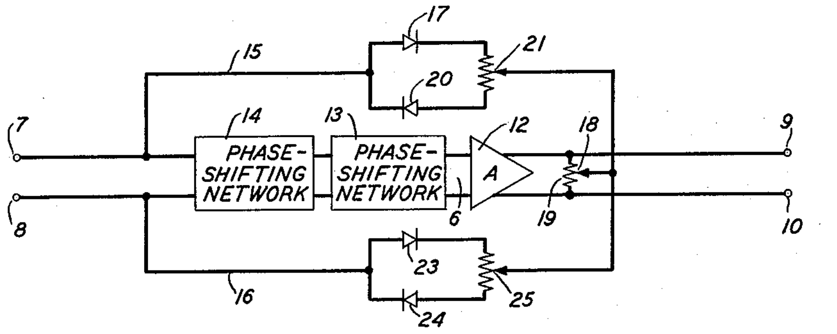
Fig. 1 is a schematic circuit of a balanced differential-phase corrector in accordance with the invention, with an amplifier and the 90-degree phase-shifting network both in the main signal path.

Taking up the figures in greater detail, the balanced differential-phase corrector of Fig. 1 comprises a main signal transmission path 6 connected between a pair of input terminals 7, 8 and a pair of output terminals 9, 10. The path 6 includes an amplifier 12 and two phase-shifting networks 13 and 14 connected in tandem. The amplifier 12 has a phase shift of either zero or 180 degrees at the frequency $f$, which may be the color carrier frequency of a color television system. The network 13 is an all-pass structure having a phase shift of approximately 90 degrees at $f$. The auxiliary network 14 compensates for any phase distortion in the amplifier 12. The network 14 may be omitted in some cases, or its phase shift added to that of the network 13.

The branches 15 and 16 constitute a second transmission path, connected in parallel with the path 6 at their input ends. The branches 15 and 16 are connected at their output ends to the adjustable tapping point 18 on a voltage divider 19 shunted across the path 6 at its output end.

The parallel combination of two oppositely disposed, nonlinear impedance devices 17 and 20 is connected in series with the branch 15. At their output ends, these devices are connected through a voltage divider with an adjustable tapping point 21. The branch 16 includes two more similarly arranged, nonlinear devices 23 and 24 connected at one end through a voltage divider with an adjustable tapping point 25. The devices 17, 20, 23, and 24 may, for example, be crystal-diode, copper-oxide, selenium, or electron-tube rectifiers, neon or similar-type gas tubes, or nonlinear resistors, capacitors, or inductors. They are shown as rectifiers. Each of these devices may be replaced by two or more nonlinear devices, and biasing currents or voltages, or additional series or shunt resistors, may be employed as an aid in providing the required characteristic to correct the distortion of the input signal.

If the points 18, 21, and 25 are centrally positioned, the corrector introduces no correction. The branch 15 provides a positive phase correction. Moving the point 21 adjusts the correction between the positive excursion of the input signal and the negative excursion. The branch 16 provides a negative phase correction, and the setting of the point 25 determines the distribution between the positive excursion and the negative excursion. The setting of the point 18 and the choice of the gain furnished by the amplifier 12 determine the magnitude or the range of the correction. The gain of the amplifier 12 may be made adjustable and may be so set that there is no overall loss, or that there is even a gain, in the corrector. This is an important feature when a low-level signal is to be corrected.

If only a positive phase correction is required, the branch 16 may be omitted. If a negative correction only is required, the branch 15 may be omitted.

Figure 2:
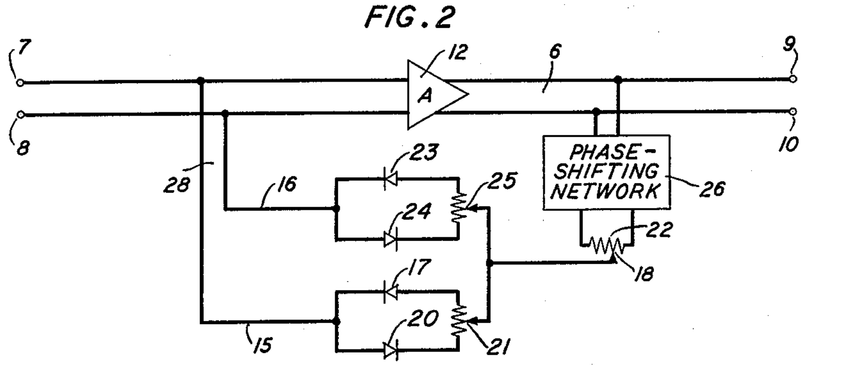
Fig. 2 shows schematically a modification of the corrector of Fig. 1, with the 90-degree phase-shifting network in the control path.

Fig. 2 shows a modification of the corrector of Fig. 1. The 90-degree phase-shifting network 26 appears here in the phase-control path 28 between the voltage divider 22 and the output end of the path 6. The network 13 is not required, and the auxiliary network 14 has also been omitted. The circuit functions in the same way as the one shown in Fig. 1, but has the advantage thereover that some transmission irregularity in the main path 6 is avoided by the removal of the networks 13 and 14. In Fig. 2, the network 26 may be moved to the input end of the control path 28, if desired, without affecting the operation of the circuit.

Figure 3:
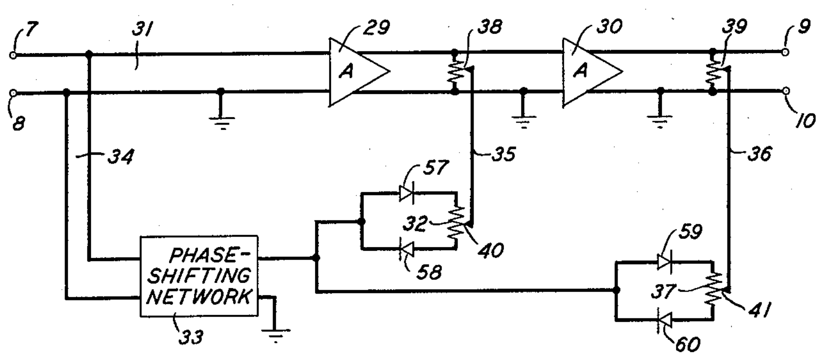
Fig. 3 shows an unbalanced corrector employing two amplifiers in the main path.

Fig. 3 shows an unbalanced differential-phase corrector in accordance with the invention employing two tandem-connected amplifiers 29 and 30 in the main transmission path 31 and the network 33 in the control path 34. One side of the circuit may be grounded, as shown. Each of the amplifiers 29 and 30 has a phase shift of 180 degrees at $f$. The network 33 has a phase shift of approximately 90 degrees at $f$. At the output end of the network 33, the path 34 divides into two branches, 35 and 36. Positive phase correction is provided by the nonlinear impedance devices 57 and 58 in the branch 35, which terminates at the adjustable tapping point 38 on a voltage divider shunted across the path 31 at a point between the amplifiers 29 and 30. The branch 36, terminating at the adjustable tapping point 39 on a voltage divider at the output end of the path 31, takes care of negative phase correction by means of the nonlinear impedance devices 59 and 60. The settings of the tapping points 40 and 41 on the resistors 32 and 37, respectively, determine the distribution of the correction characteristics as between the positive excursion and the negative excursion. The settings of the points 38 and 39 and the gains of the amplifiers 29 and 30 determine the magnitudes of the corrections. The phase network 33 may be shifted to the input end of the path 31, if desired, but the position shown is preferred. Also, each of the resistors 32 and 37 may be replaced by two adjustable resistors, arranged so that the resistance in series with each nonlinear device is independently controllable, if desired. One of the branches 35 and 36 may be omitted if only one type of phase correction is required.

Figure 4:
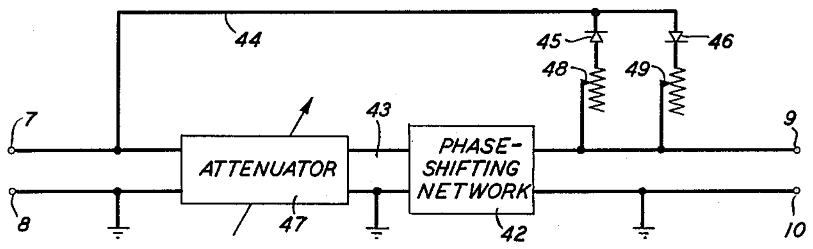
Fig. 4 shows an unbalanced corrector using an attenuator.

Fig. 4 shows an unbalanced differential-phase corrector which requires no internal amplifier, although one may be connected in tandem therewith, if desired. The circuit comprises a phase-shifting network 42 and an attenuator 47 connected in tandem in the signal path 43. One side of the structure may be grounded, as shown. The control path 44 is connected in parallel with the path 43, between the input terminal 7 and the output terminal 9. The parallel combination of the two oppositely disposed, nonlinear impedance devices 45 and 46 is connected in series with the path 44. These devices are shown as rectifiers. The output end of the rectifier 45 is connected to one end of a resistor having an adjustable tapping point 48 connected to the terminal 9. The rectifier 46 is similarly connected to the terminal 9 through a resistor with an adjustable tapping point 49.

The attenuator 47 is preferably made adjustable, either continuously or in steps, so that the output voltage of the path 43 may be adjusted to provide the required curve shape to compensate the distortion. The network 42 has a phase shift of approximately 90 degrees at $f$. Thus, a voltage which may be adjusted in amplitude by the attenuator 47 and shifted in phase by the network 42 is combined at the output terminals 9 and 10 with a voltage from the path 44. This circuit provides only positive phase correction. The setting of the tapping point 49 determines the magnitude of the correction on the positive excursion and the position of the point 48 controls the correction on the negative excursion.

Figure 5:
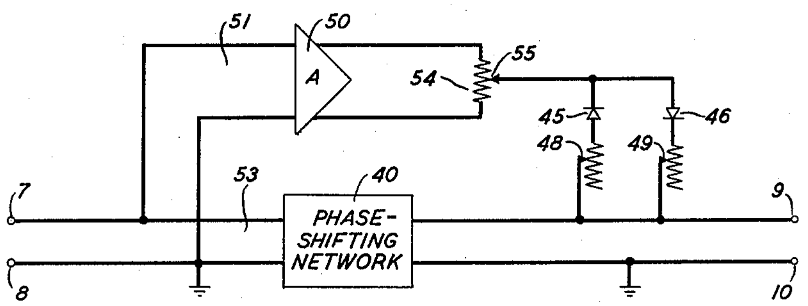
Fig. 5 shows an unbalanced corrector with the 90-degree network in the main path and an amplifier in the control path.

The unbalanced circuit of Fig. 5 is similar to the one shown in Fig. 4 except that the amplitude-adjusting means comprise an amplifier 50 in the control path 51 instead of an attenuator in the signal path 53. The amplifier 50 is terminated in a voltage divider 54 with an adjustable tapping point 55 to which the input ends of the rectifiers 45 and 46 are connected. The setting of the point 55 determines the shape of the correction characteristic. The correction is a positive phase shift if the amplifier 50 has zero phase shift at $f$. The correction is negative if the phase shift of the amplifier 50 is 180 degrees at $f$. The settings of the points 48 and 49 control the correction on the negative excursion and the positive excursion, respectively. The gain of the amplifier 50 may be so selected or adjusted that there is no overall loss in the corrector. The phase network 40 may be removed from the path 53 and inserted in the control path 51, either before or after amplifier 50, without altering the operation of the circuit.

Figure 6:
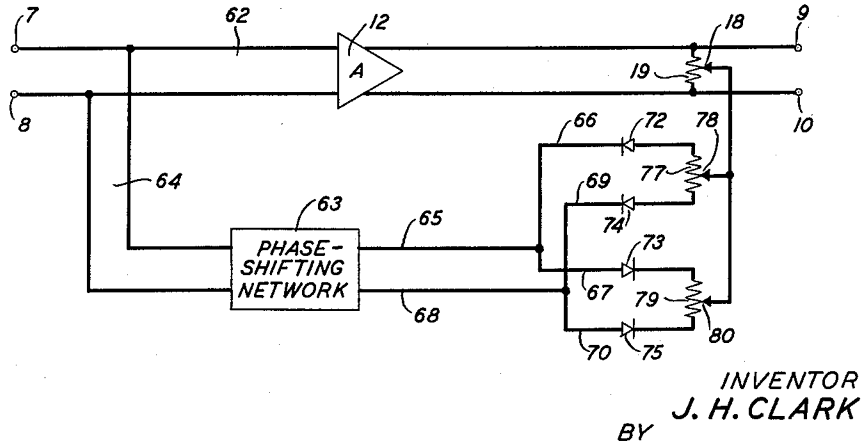
Fig. 6 shows an additional modification of Fig. 1 with the phase-shifting network at the input end of the control path and with the nonlinear devices differently arranged.

Fig. 6 shows another balanced differential-phase corrector which is a modified form of the one shown in Fig. 1. The main signal path 62 includes only the amplifier 12 and the voltage divider 19 with tapping point 18. The network 63, located at the input end of the phase-control path 64, has a phase shift of approximately 90 degrees, plus or minus any phase compensation required for the amplifier 12, at the frequency $f$. At the output end of the network 63, one side 65 of the path 64 divides into two branches, 66 and 67, and the other side 68 divides into the branches 69 and 70. The nonlinear impedance devices 72, 73, 74, and 75, shown as rectifiers, are connected, respectively, in the branches 66, 67, 69, and 70. The branches 66 and 69 are connectd at their output ends through a voltage divider 77 having an adjustable tapping point 78. The branches 67 and 70 are likewise connected through another voltage divider 79 having an adjustable tapping point 80. The points 78 and 80 are connected to the point 18.

The rectifiers 72 and 74 control the correction on the positive excursions of the signal and the rectifiers 73 and 75 control on the negative excursion. The settings of the points 78 and 80 determine whether the correction is a positive or a negative phase shift. The gain of the amplifier 12 and the setting of the point 18 determine the magnitude of the correction.

It is to be understood that the above-described arrangements are only illustrative of the application of the principles of the invention. Numerous other arrangements may be devised by those skilled in the art without departing from the spirit and scope of the invention. For example, when the nature of the distortion is such that one or more of the nonlinear impedance devices are seldom or never needed in order to provide satisfactory equalization, they may be omitted, since their inclusion would serve no useful purpose for that particular application. Also, it is evident that any of the equalizers disclosed may include an amplifier in one of the parallel transmission paths and an attenuator in the other.

What is claimed is:

1. In a color television system in which changes in the amplitude of the luminance signal cause changes in the relative phase of the color carrier signal with respect to a reference synchronizing signal, a network for compensating these phase changes comprising a pair of input terminals, a pair of output terminals, a phase-shifting network and an attenuator connected in tandem between the input terminals and the output terminals, two rectifiers with unlike electrodes connected to an input terminal, a path including a resistor connected between the remaining electrodes of the rectifiers, and a connection from the resistor to an output terminal.

2. In a color television system in which changes in the amplitude of the luminance signal cause changes in the relative phase of the color carrier signal with respect to a reference synchronizing signal, a network for compensating these phase changes comprising a pair of input terminals, a pair of output terminals, a phase-shifting network and an attenuator connected in tandem between the input terminals and the output terminals, and the series combination of a rectifier and a resistor connected between an input terminal and an output terminal.

3. In a color television system in which changes in the amplitude of the luminance signal cause changes in the relative phase of the color carrier signal with respect to a reference synchronizing signal, a network for compensating these phase changes comprising a pair of input terminals, a pair of output terminals, a phase-shifting network and amplitude-changing means connected in tandem between the input terminals and the output terminals, two rectifiers with unlike electrodes connected to an input terminal, a path including a resistor connected between the remaining electrodes of the rectifiers, and a connection from the resistor to an output terminal.

4. In a color television system in which changes in the amplitude of the luminance signal cause changes in the relative phase of the color carrier signal with respect to a reference synchronizing signal, a network for compensating these phase changes comprising a pair of input terminals, a pair of output terminals, two transmission paths between the input terminals and the output terminals, a phase-shifting network in one of the paths, amplitude-changing means associated with one of the paths, and one of the paths including two rectifiers with unlike electrodes connected to an input terminal, a path including a resistor connected between the remaining electrodes of the rectifiers, and a connection from the resistor to an output terminal.

5. In a color television system in which changes in the amplitude of the luminance signal cause changes in the relative phase of the color carrier signal with respect to a reference synchronizing signal, a network for compensating these phase changes comprising a pair of input terminals, a pair of output terminals, two transmission paths between the input terminals and the output terminals, a phase-shifting network in one of the paths, amplitude-changing means associated with one of the paths, and the series combination of a rectifier and a resistor connected in series in one of the paths.

References Cited in the file of this patent

UNITED STATES PATENTS

| | | |
|---|---|---|
| 2,252,002 | Halsey | Aug. 12, 1941 |
| 2,444,063 | Pfleger | June 29, 1948 |
| 2,776,410 | Guanella | Jan. 1, 1957 |
| 2,849,546 | Martin | Aug. 26, 1958 |